(12) United States Patent
Yasuda

(10) Patent No.: US 6,477,499 B1
(45) Date of Patent: *Nov. 5, 2002

(54) WINDOW CONTROL APPARATUS AND METHOD HAVING FUNCTION FOR CONTROLLING WINDOWS BY MEANS OF VOICE-INPUT

(75) Inventor: Seigou Yasuda, Toyonaka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/420,406

(22) Filed: Oct. 18, 1999

Related U.S. Application Data

(63) Continuation of application No. 08/589,181, filed on Jan. 19, 1996, now Pat. No. 5,974,384, which is a continuation of application No. 08/035,628, filed on Mar. 23, 1993, now abandoned.

(30) Foreign Application Priority Data

Mar. 25, 1992 (JP) ............................................. 4-66989

(51) Int. Cl.[7] ............................................. G10L 21/00
(52) U.S. Cl. ..................... 704/275; 270/246; 345/340; 345/343; 345/326
(58) Field of Search .................. 704/270, 275, 704/246, 247; 345/340, 326, 343–345

(56) References Cited

U.S. PATENT DOCUMENTS

| | | | | |
|---|---|---|---|---|
| 4,766,529 A | * | 8/1988 | Nakano et al. | 364/513.5 |
| 4,776,016 A | * | 10/1988 | Hansen | 704/275 |
| 4,821,211 A | | 4/1989 | Torres | |
| 5,157,384 A | | 10/1992 | Greanias et al. | |
| 5,252,951 A | * | 10/1993 | Tannenbaum et al. | 345/156 |
| 5,297,253 A | * | 3/1994 | Meisel | 395/190 |
| 5,355,433 A | | 10/1994 | Yasuda et al. | |
| 5,745,717 A | * | 4/1998 | Vayda et al. | 395/352 |
| 5,790,820 A | * | 8/1998 | Vayda et al. | 395/352 |
| 5,864,819 A | * | 1/1999 | De Armas et al. | 704/275 |
| 5,873,064 A | * | 2/1999 | De Armas et al. | 704/275 |
| 5,974,384 A | * | 10/1999 | Yasuda | 704/275 |

OTHER PUBLICATIONS

J. Fujimoti, et al., "Speaker–Independent Word Recognition Using Fuzzy Pattern Matching", Fuzzy Sets and Systems 32(1989) pp. 181–191.
C. Schmandt, "Voice And Window Systems: Some User–Interface Considerations", 6th Symposium on Human Interface, Oct. 24–26, 1990 Tokyo, pp. 533–540.
Schmandt, et al., "Augmenting a Window System With Speech Input", computer vol. 23, No. 8, Aug. 1990, pp. 50–56.

* cited by examiner

Primary Examiner—Vijay Chawan
(74) Attorney, Agent, or Firm—Cooper & Dunham LLP

(57) ABSTRACT

A display unit displays at least a window from among a plurality of windows. A window switching unit switches a currently active window between windows among the plurality of windows in accordance with a corresponding voice-input, the voice-input comprising relationship command indicating a relationship between the currently active window and a window to be activated from the windows among the plurality of windows. The relationship command indicates a relationship concerning an arrangement of the plurality of windows, the relationship comprising a relationship between the currently active window and a window to be activated from the windows among the plurality of windows.

23 Claims, 6 Drawing Sheets

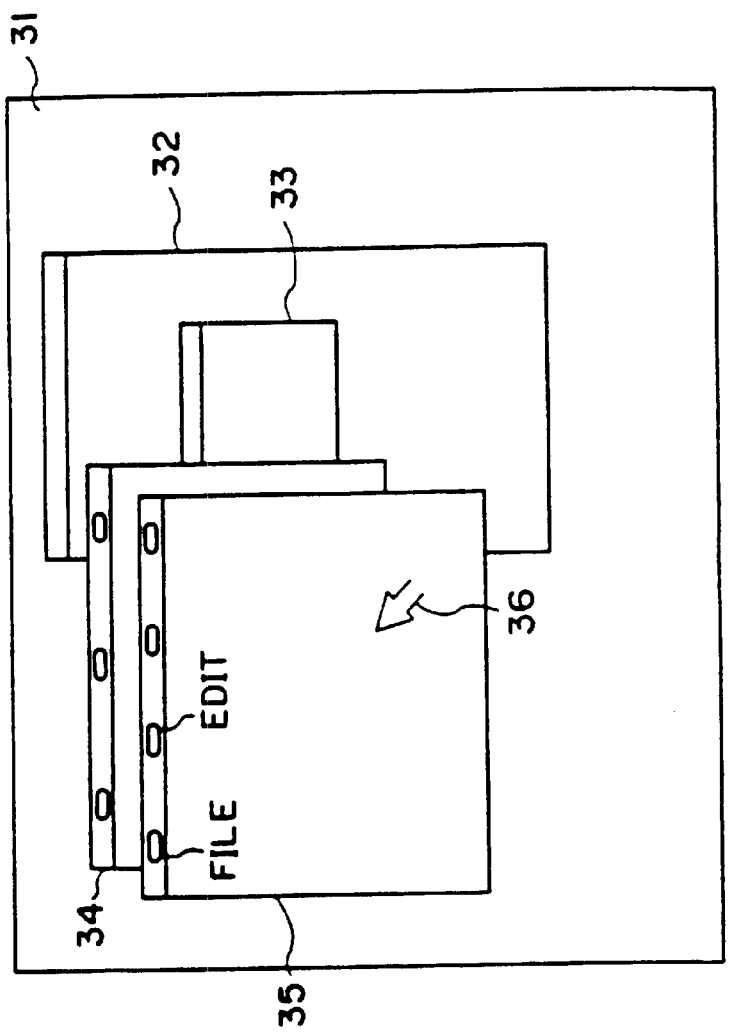

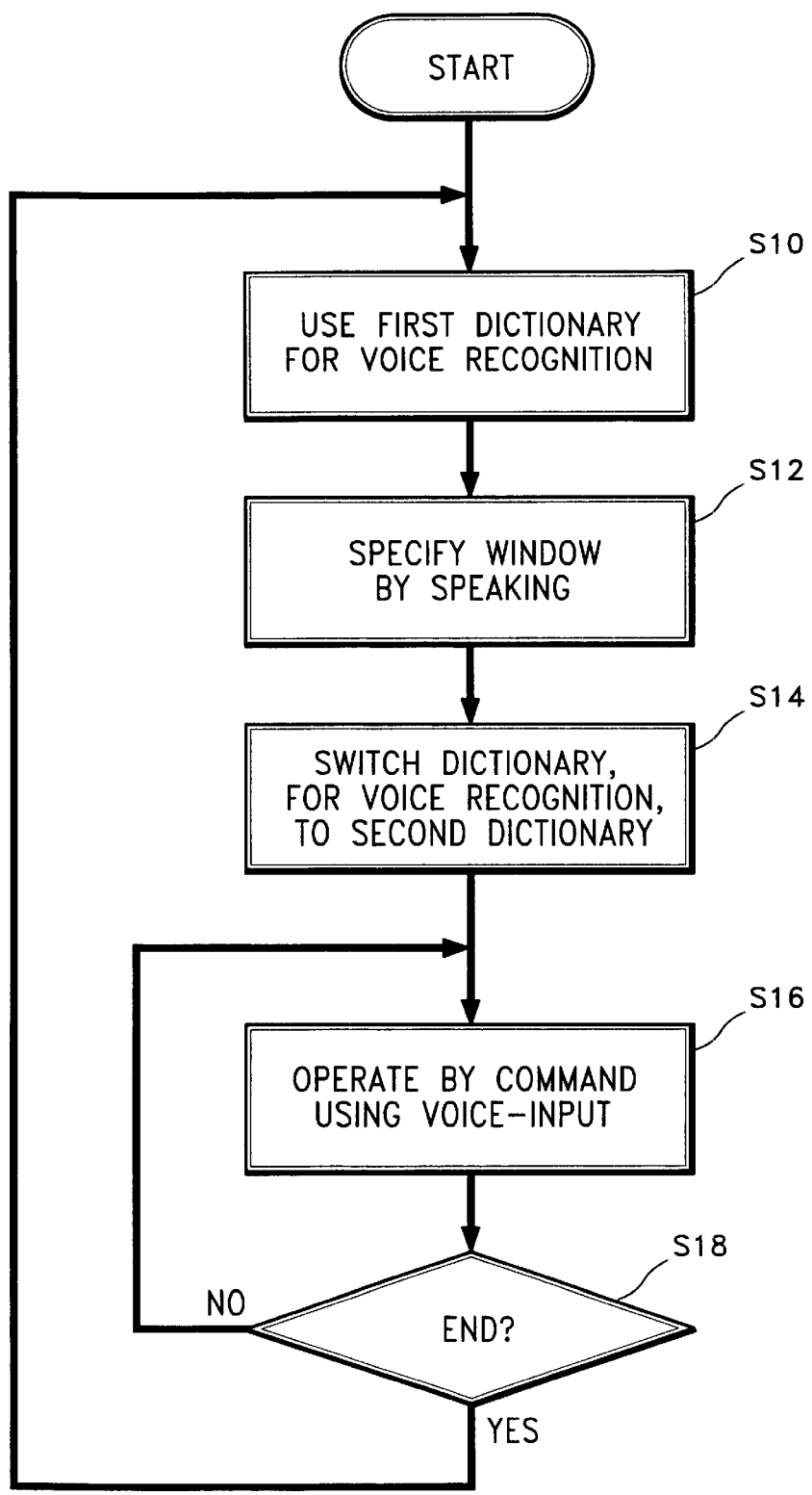

WINDOW CONTROL APPARATUS AND METHOD HAVING FUNCTION FOR CONTROLLING WINDOWS BY MEANS OF VOICE-INPUT

This is a continuation of application Ser. No. 08/589,181 filed Jan. 19, 1996, now U.S. Pat. No. 5,974,384, which is a file wrapper continuation of application Ser. No. 08/035,628 filed Mar. 23, 1993, now abandoned.

BACKGROUND OF THE INVENTION

The present invention relates to a window (Such a term "window", in general, means, in applications and graphical interfaces, a portion of the screen that can contain its own document or message.) control apparatus and method, and particularly relates to a window control apparatus and method having a function for controlling a window in accordance with a voice-input other than input including a keyboard input or a pointing-device input; the voice-input control being executable as a result of recognizing voice-input. A computer system may employ such a window control apparatus and method so as to improve control efficiency thereof.

There are some examples, in related art, of applications of such a voice-input control system (called "voice recognition system") for computer control. In an example of such a voice recognition system according to the related art, a process of recognizing voice-input is executed in response to a corresponding command output by the computer. The voice recognition system of the above related art, after outputting to the computer a recognition execution result then waits for a next command.

In computer systems including, for example, a so-called personal computer and a so-called work station, a window system is used as a so-called graphical user interface. Such a graphical user interface, in general, is a type of display format that enables the user to choose commands, start programs, and see lists of files and other options by pointing to pictorial representations (icons) and lists of menu items on the screen.

However, there are only few examples in the related art of system using voice-input control system for controlling windows. The examples include an example disclosed in a reference "C. Schemandt, 6th Symposium on Human Interface 1321, p 533–540 (1990, Tokyo)".

A computer system which employs such a window system, in general, has a construction comprising software and/or hardware, in which the control of such a window in the screen is, in general, close in relationship to the control of the operating system (OS) and it is thus difficult to control the window by means of voice-input. Thus, it is necessary for realizing a voice recognition process in the system that the system may provide a signal to the operating system (OS), such signal resulting from executing voice input, as if the input had been executed by the keyboard or the mouse(a mouse is used as a pointing device). The term pointing device, in general, means an input device used to control an on-screen cursor for such actions as "pressing" on-screen buttons in dialog boxes, choosing menu items, and selecting ranges of cells in spreadsheets or groups of words in a document. The most common pointing device is the mouse.

In the computer system of the related art, comprising the above mentioned construction, in a case where a voice-input operation is executed so as to control the window system, a method for activating particular windows may be, in general, easily devised such that a name is given to each window and then an operation of calling such a name results in a corresponding window being activated. In this computer system of the related art, reference voice patterns have to be registered as well as do names used for identifying particular windows. Then, after determining the names (comprising words) used for the particular windows by the user, the user's calling the name results in activating the corresponding window. However, it is troublesome for the user to register reference voice patterns as well as registering those names of the particular windows.

There are two reasons for the requirement that the user has to register his or her reference voice patterns as well as register words themselves in the voice recognition system. A first reason is that, because characteristic quantities of voice input vary depending on particular speakers, it may be technically difficult to accurately and uniformly recognize voice input regardless of differences between particular speakers. Thus, it may take time for finally reaching an accurate recognition without registering the reference voice patterns of the speaker. A second result ensures the above first result. By registering the reference voice patterns of the speaker, the voice recognition system may reach an accurate voice recognition relatively easily. Thus, it is possible that many and various words may be recognized by the system with relatively high speed.

Further, a pointing device such as a mouse is generally used for control of the window system. In using a mouse as a pointing device for control of the window system, troublesome operations are required for a desired window to be activated, following which a desired control command must be searched for and specified from among a plurality of control commands provided for control of the window. (The search may be executed successively so that repeated selecting may be executed for tracing a tree construction or a hierarchy construction i.e. from a generic command to more specific commands.) The operations generally take up a considerable amount of time for activating the desired window from among a plurality of windows by accessing data concerning the window as a result of retrieval of data concerning the window, and then the operations for selecting the control command are still required. Thus, those operations are troublesome and time consuming for the user.

Furthermore, in the system of the related art system employing the voice-input system, all words concerning the plurality of windows have to be obtained by the system through recognition of voice-input, thus a degrading of the recognition efficiency occurs and a considerable amount of time is required for the recognition process. (A degrading of the recognition efficiency includes, for example, increase of the time required for finally reaching an accurate voice recognition result.)

SUMMARY OF THE INVENTION

An object of the present invention is to provide a window control apparatus and method which are applicable to computer systems including, for example, a personal computer and a work station, the computer system employing inputting means including a keyboard and a mouse, the window control apparatus and method providing efficient control of a window system by means of voice-input.

To achieve the above object, a window control apparatus according to the present invention comprises:

display means for displaying at least a window of plurality of windows; and window switching means for switching a currently active window among said plurality of windows, the switching being in accordance with a corresponding voice-input, said voice-input comprising a relationship command, said relationship command indicating a relationship between the currently active window and another window from among said plurality of windows, which other window is to be the active window.

By the above constitution, the voice-input recognition is carried out on a limited number of words indicating the above relationship between the currently active window and a window, to be activated.

Other objects and further features of the present invention will become more apparent from the following detailed description when read in conjunction with the accompanying drawings.

BRIEF DESCRIPTION OF THE DRAWINGS

FIG. 3 shows an example of a plurality of windows displayed on a screen in accordance with the embodiment of the present invention, the windows of the plurality of windows being open;

FIGS. 5A and 5B show operation flows according to the embodiment of the present invention, in accordance with which operation flow a voice recognition process is executed.

DESCRIPTION OF THE PREFERRED EMBODIMENT

Figure 1:
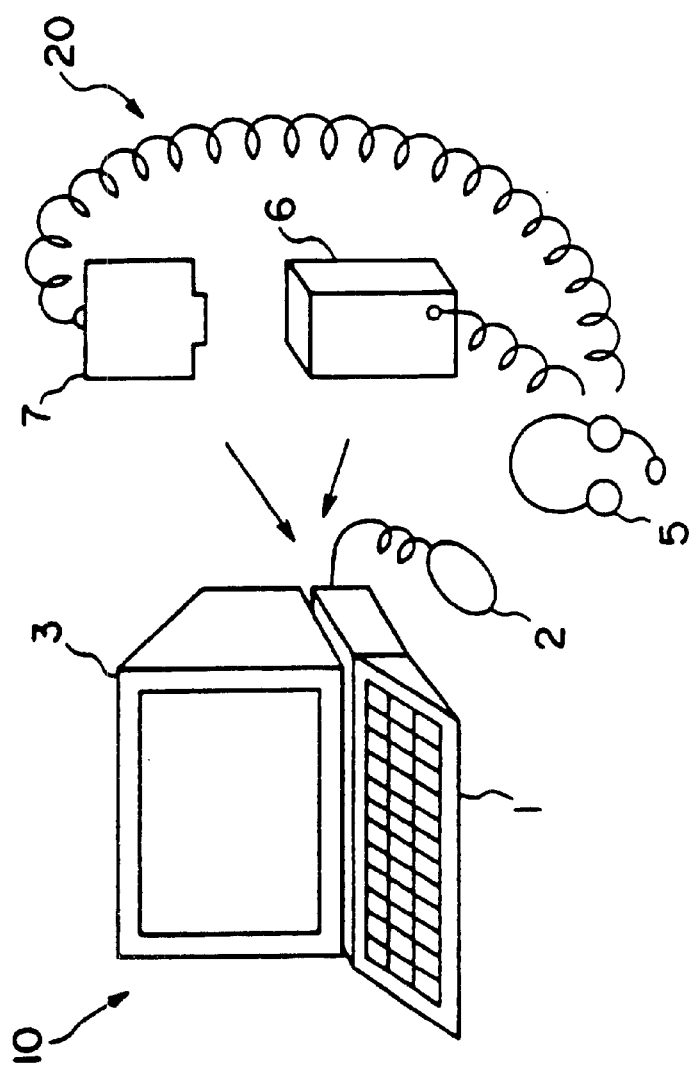
FIG. 1 shows an external appearance of a personal computer system applying an embodiment of the present invention.

Principles of the constitution of a window control apparatus according to an embodiment of the present invention will now be described.

The window control apparatus comprises a display screen and a keyboard, switching of display on the screen from window to window being effected in response to corresponding keyboard input. The window control apparatus further comprises a first dictionary in which reference voice-patterns are stored, the reference voice patterns being used for converting voice-input from any speaker into a corresponding specification. The above specification may comprise, for example, a relationship between a currently active window and a window to become active, or the relationship concerning information of relative positions (this relative positions comprising, for example, relative positions on the screen) of the windows. The window to become active (the other window) is a window to be utilized by the user. The window control apparatus further comprises a second dictionary in which reference voice patterns are stored, the reference voice patterns being used for converting voice-input from a particular speaker into a corresponding specification. The specification may be for specifying a control command, which control command may be a window control command from among a plurality of window control commands previously provided for each window. The window control apparatus further comprises voice recognition means which extracts characteristic quantities from the voice-input, compares the extracted characteristic quantities with corresponding quantities of the reference voice patterns stored in the first and/or second dictionaries, and then executes a recognizing process on the voice-input. The window control apparatus further comprises a voice-keyboard input emulator means which converts a result of the recognition, into a corresponding keyboard-input data (the keyboard input being identical to, for example, an input data obtained by user operations on the keyboard), the recognition being executed by means of the voice recognition means. Thus, the window control apparatus may be used for selecting a window to be active.

Furthermore, the window control apparatus comprises a mouse and voice-mouse input emulator means. The voice-mouse input emulator means converts a result of the recognition into corresponding mouse-input data identical to, for example, data of user operations on the mouse, the recognition being executed by means of the voice recognition means. The above conversion is executed if the result of the voice-input recognition corresponds to a word(s) obtained from the first dictionary, the obtained word being a word corresponding to mouse-input data (pointing operation input data). Thus, the window control apparatus may be utilized for replacing a pointing operation by voice-input.

Further, in the window control apparatus, it is possible for the above voice recognition means to execute an operation for recognizing the voice-input to be a corresponding word(s) using only the second dictionary, this being possible after a desired window has already been selected by means of the voice-input.

The above relationship concerning relative positions of the two windows may comprise, for example, a "front window" and a "hind window", (that is, the window is arranged sequentially, and a window located immediately previous, in the sequence, the active window is called a "previous window" whereas a window located immediately after, in the sequence, the active window is called a "next window".) Thus, in such a selecting operation of the window to be active, a direct name of each window is not used. In the second dictionary the user may register voice patterns corresponding to control commands including the window control commands provided for each window. Thus, the user (the particular speaker) may input, by means of his or her voice, various specifications including the window control commands for each window, the input specification being then processed using the second dictionary which includes the voice patterns the user has registered.

Furthermore, for the above replacement of the mouse-input by the voice-input, the first dictionary is used for storing reference voice patterns corresponding to commands for specifying a window to be active, the commands comprising words including, for example, "here" and "this window", the voice patterns being used for converting the voice-input from any speaker into the corresponding commands. The second dictionary is used for storing voice patterns corresponding to control commands including the window control commands, the voice patterns stored in the second dictionary being used for converting the voice-input from a particular speaker. The user (the particular speaker) may input various specifications including the window control commands for each window by means of his or her voice. The result of the recognition, which recognition was executed by means of the voice recognition means using the first dictionary, is then emulated (converted) into corresponding mouse-input data, the voice-input to be converted into corresponding mouse-input data concerning a position of a mouse cursor displayed on a screen of a display unit, which position may move correspondingly to movement of the mouse operated by the user. Thus, the desired window is activated.

A construction of a personal computer system including a personal computer unit 10 and a voice recognition unit 20 according to the embodiment of the present invention will now be described with reference to FIG. 1. The personal computer unit 10 comprises inputting means including a keyboard 1 and a mouse 2, and a display means including a display unit 3. A voice recognition unit 20 is connected to the personal computer unit 10. The voice recognition unit 20 has a microphone 5, and may comprise one of a plurality of voice recognition units, the plurality of voice recognition units including a stand alone type recognition unit 6 and a voice recognition board 7, which voice recognition unit is to be connected to an extension bus of the personal computer unit 10.

A basic hardware construction of the personal computer system shown in FIG. 1 will now be described with reference to FIG. 2. In the voice recognition unit 20, a voice signal, input by means of the microphone 5, is amplified and shaped in a preliminary processing unit 21. Then, the amplified and shaped signal is processed by the characteristic quantities extraction unit 22 so that the unit 22 extracts characteristic quantities which are to be used in a recognition process. A recognition unit 23 then performs a recognition process on the extracted characteristic quantities, so that the unit 23 compares the extracted characteristic quantities with reference voice patterns corresponding to words, the reference voice patterns being stored in the above first dictionary 26 and the above second dictionary 27, both dictionaries having been previously made and being included in a reference pattern unit 25. As a result, the unit 23 obtains a recognition result comprising a word that corresponds to a voice pattern in a dictionary, which voice pattern in the dictionary is the most similar to the voice pattern corresponding to the extracted characteristic quantities. The recognition unit 23 utilizes a voice recognition system for a non-particular speaker, that is, a voice-input recognition system for recognizing a voice-input from any speaker. One example of such a voice recognition system is disclosed in "Speaker Independent Word Recognition Using Fuzzy Pattern Watching" (Fuzzy Set and Systems 32(1989) p. 181–191) written by J. Fujimoto. Data concerning reference voice patterns corresponding to necessary words have been previously stored in the reference pattern unit 25. After a recognition process, a result processing unit 24 then transfers the result of the recognition to the above voice-keyboard (input) emulator 14 and to the above voice-mouse (input) emulator 15, both being included in the personal computer unit 10.

In the personal computer unit 10, a CPU 11 is connected to an OS (Operating System) 12 and the OS 12 is connected to a keyboard BIOS 16 and a mouse BIOS 17 as well as being connected to a memory 13 and a display unit 3. The keyboard 1 is connected to the OS 12, via a keyboard buffer 18 and the keyboard BIOS 16. The mouse 2 is connected to the OS 12, via a mouse buffer 19 and the mouse BIOS 17.

There may be many cases where a voice processing BIOS (Basic Input/Output System) is not provided for standard computer systems, particularly is not provided for standard personal computer systems and standard work stations, the voice processing BIOS being used for processing a result of recognition of voice-input. Thus, in the personal computer system according to the embodiment of the present invention it is needed that a system that at least emulates a voice processing BIOS is provided, that is, the personal computer system is required to apply a method which enables the system to function as if the system comprises the voice processing BIOS. One example of an effective method for realizing this provision is disclosed by the present applicant in the Japanese Laid-Open Patent Application No. 3-206521 (see U.S. Pat. No. 5,231,691 issued Jul. 27, 1993), which application discloses a voice-keyboard emulator. The voice-keyboard emulator 14 may comprise the emulator disclosed in the application. As shown in FIG. 2, output of the voice-keyboard emulator 14 is input to the keyboard buffer 18, the output being obtained as a result of processing the recognition result, the recognition having been executed by the voice recognition unit 20. The keyboard buffer 18 is provided between the keyboard 1 and the keyboard BIOS 16. Then, the keyboard buffer 18 processes the output provided by the voice-keyboard emulator 14 as output from the keyboard 1. Then, the voice-keyboard emulator 14 transmits to the OS 12 data indicating a code, that corresponds to an abbreviation-word of a function name, the function name concerning a command used in window control software, the abbreviation-word corresponding to the recognition result provided by the result processing unit 24. The above transmission is executed via the keyboard buffer 18 and the keyboard BIOS 16. The above code corresponds to a keyboard input corresponding to the above abbreviation-word of the function name concerning the command used in window control software. That is, in the voice-keyboard emulator 14, a keyboard-input string is previously assigned to each reference voice pattern, which pattern corresponds to a voice fragment indicating an abbreviation-word of a function name concerning each command used in the window control software. The above keyboard-input string corresponds to a keyboard input indicating the code of the above abbreviation-word. Thus, the voice-keyboard emulator 14 determines the assigned keyboard-input string correspondingly to the received result of recognition, which result corresponds to the voice-input and then transfers the string to the keyboard buffer 18. Thus, the OS 12 can operate correspondingly to the transferred string exactly as if the string has been transferred from the keyboard 1, the string being transferred to the OS 12 via the keyboard buffer 18 and the keyboard BIOS 16. In a case of a mouse input, replaced by the voice-input, is similar to the above-mentioned operation flow for the case of replacing input performed by means of an operation of the keyboard 1. That is, in the voice-mouse emulator 15, a mouse-input string is previously assigned to each reference voice pattern corresponding to a voice fragment that indicates an abbreviation-word of a function name concerning each command used in window control software. The mouse-input string corresponds to mouse input indicating the code of the above abbreviation-word. Thus, the voice-mouse emulator 15 determines an assigned mouse-input string corresponding to the received recognition result, which result corresponds to the voice-input; the voice-mouse emulator then transfers the determined string to the mouse buffer 19. Thus, the OS 12 can operate accordingly to the transferred string as if the string had been transferred from the mouse 2, the string being transferred to the OS 12 via the mouse buffer 19 and the mouse BIOS 17.

The OS 12 comprises a screen control unit 121 and controls the windows smoothly using the screen control unit 121 and using the above-mentioned voice-inputting system including the emulators 14 and 15. Further, as mentioned above, the OS 12 treats the voice-input as if were input from the keyboard 1 or the mouse 2.

Following will be described, with reference to FIG. 3, an example of some ways in which a plurality of windows may be displayed on the display unit 3 of the personal computer system according to the present invention. In this example, four windows 32, 33, 34 and 35 are open in the screen 31 of the display unit 3. Three windows 33, 34 and 35 are open in this sequence, in front of the hindmost window 32. A cursor 36 is displayed in the frontmost window 35, the cursor 36 being used in a pointing operation using the mouse 2. Further, in an uppermost portion of the frontmost window 35, commands including a command "file" and a command "edit" are displayed.

Figure 4A:
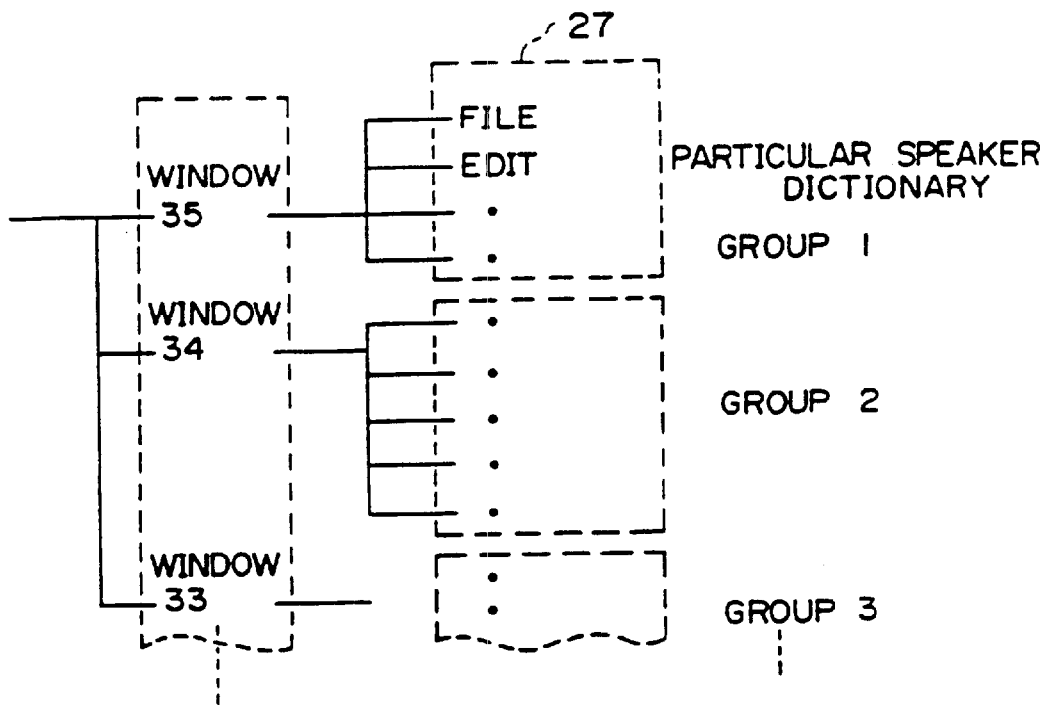
FIGS. 4A and 4B show constitutions of various window control dictionaries according to the embodiment of the present invention, which dictionaries are used as reference voice patterns.

Constructions of various window control dictionaries registered in the reference pattern unit 25 will now be described with reference to FIGS. 4A and 4B. In the personal computer system according to the present invention, a first sort of commands and a second sort of commands are used. The above first sort of commands is used for selecting a window that is to be active, and the above second sort of commands is used for selecting a control command from among a plurality of control commands provided for the selected window. The first sort of control commands are stored in the first dictionary 26 shown in FIG. 4B, and the second sort of control commands are stored in the second dictionary 27 shown in FIG. 4A.

Figure 4B:
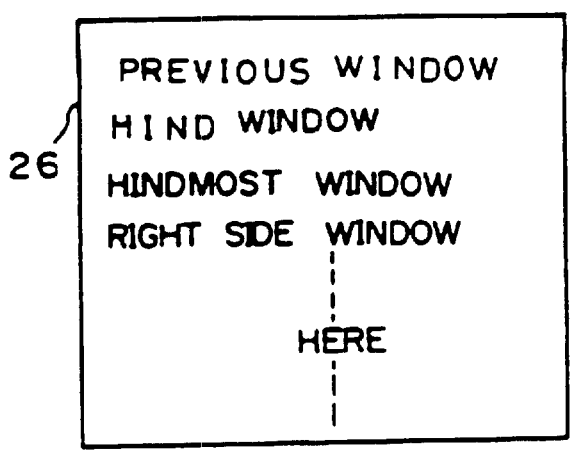

The first control commands comprise a first sort of control words, which words are used for switching between windows smoothly (that is for smoothly switching the "active" window from window to window), the words indicating relationships between a currently active window and a window to be active, including, for example, a "previous window", a "next window", a "hind window", a "right side window", the "hindmost window", as shown in FIG. 4B. These words are stored in the first dictionary 26 which is used for storing voice patterns to be used for converting voice-input from any speaker (non-particular speaker) into corresponding words. As above, the words used for selecting windows to be active do not comprise direct names of the windows, and comprise words indicating relationships between windows displayed on the screen 31, the relationship concerning the mutual arrangement of the windows in the screen 31. In such a window system, in general, a window located at the frontmost position is active, and windows other than the frontmost window correspond, for example, to the "hind window". The user may switch the currently active window so as to select a window it is desired to activate by speaking words such as "hind window", correspondingly to the relationship between the currently active window and the window desired to be active in the arrangement of the windows. As mentioned above, the words have been previously registered as reference voice patterns for non-particular speakers, the words being thus able to be used by the user (particular speaker) unless the user has registered the words comprising their reference voice patterns.

In the case where the voice-input replaces operations of the mouse 2, reference voice patterns corresponding to words (including, for example, "here" and "this window") that correspond to operations of the mouse 2 are stored in the first dictionary 26 for non-particular speakers. These words indicate screen positions specifiable by the cursor 36 using the mouse 2.

For each window to be selected from the plurality of windows, the user may determine (that is, assign so as to register in the second dictionary 27) a name of each window by means of the personal computer unit 10, each name comprising words for identifying the window. After the registration (assignment), in the second dictionary 27, of the determined name of the window, it is possible for the user to specify a desired window by speaking the name of the window (or by speaking the relationship concerning relative positions of two windows) to the system, so as to provide the corresponding voice-input comprising the name of the window. Further, in the second dictionary 27, used for particular speakers, the user registers a second sort of control words corresponding to the second sort of control commands. The second sort of control words comprises window control words including, for example, words concerning user-assigned window names for selecting corresponding windows and words concerning various commands provided for each window of the plurality of windows. That is, because commands (including, for example, "file" and "edit" displayed in the uppermost portion of the frontmost window 35 of FIG. 3) provided for each window, a user-assigned name of the window having been determined by the user, vary depending on respective operations executable in each window, the user registers the commands in the second dictionary 27 for particular speakers. (Examples of respective operations executable in each window include an operation of "centering" and an operation of "saving the file" if the window corresponds to a word processing process.) Thus, groups (a group 1, a group 2, a group 3, etc., as shown in FIG. 4A) of words corresponding to the commands are provided in the second dictionary 27 for the respective windows, which windows are identified by their respective user-assigned names. In the example of FIG. 4A, the control command-words including "file" and "edit", which words are located at the uppermost portion of the frontmost window 27, have been registered in the group 1 by the user.

When the words are registered in the second dictionary 27. a voice signal input by means of the microphone 5 is amplified and shaped by the preliminary processing unit 21. Then, characteristic quantities are extracted from the amplified and shaped voice signal by means of the characteristic extraction unit 22. The extraction is executed by a frequency analyzing process so as to extract the characteristic quantities to be used in the voice recognition process. Then, by means of the recognition unit 23, the extracted characteristic quantities are registered in the second dictionary 27 in the reference pattern unit 25, the characteristic quantities being registered in a group corresponding to a window which have been identified by a user-assigned name, the group being defined in the second dictionary 27.

Figure 2:
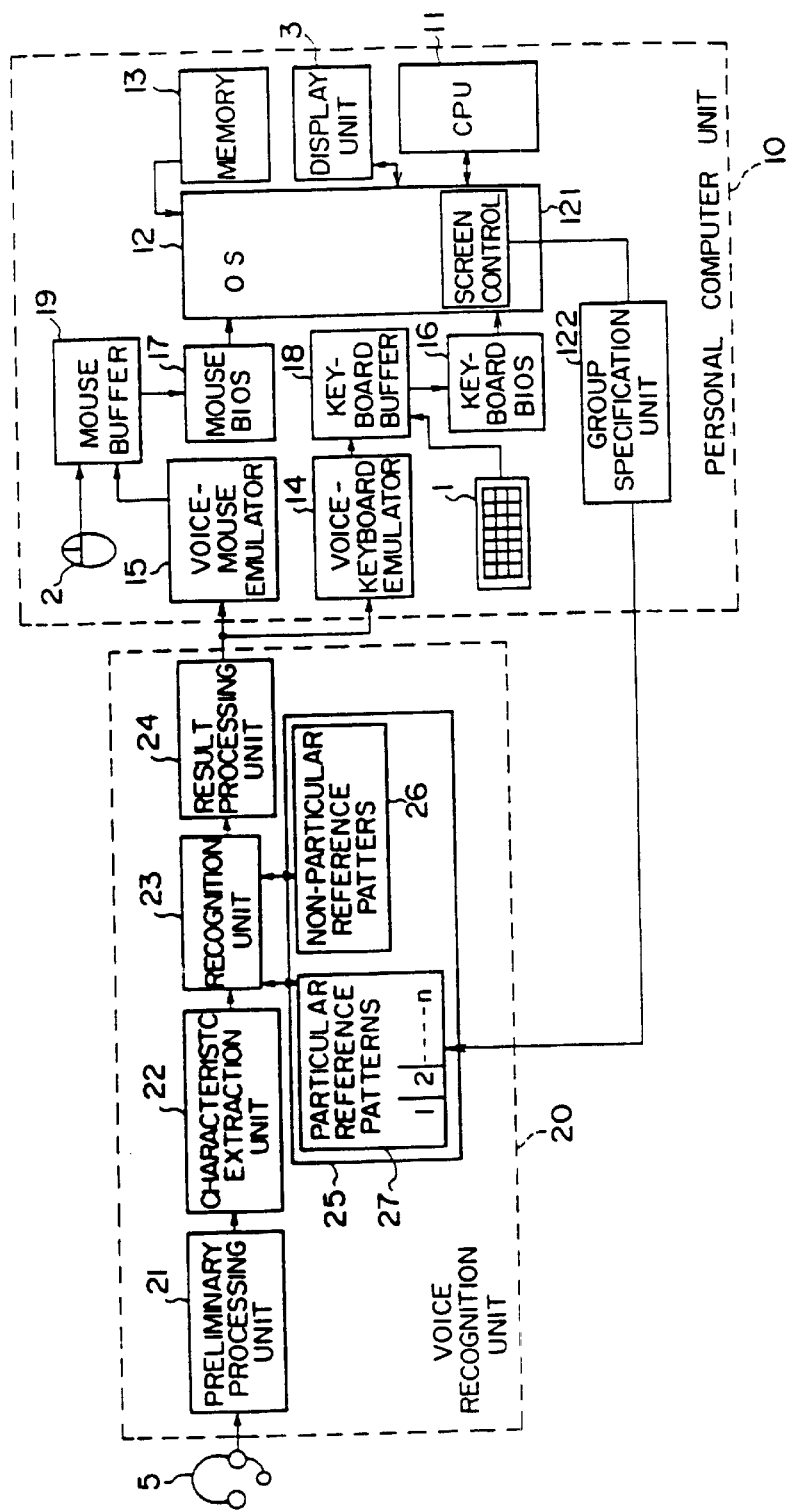
FIG. 2 shows a block diagram of a basic hardware constitution of the personal computer system of FIG. 1.

Each time the window has been selected to be active by means of window control using the mutual relationships between the windows and using the voice recognition process in which the first dictionary is used, the personal computer system of FIG. 2 switches from the first dictionary 26 to the second dictionary 27 in order to perform voice recognition of commands concerning the selected window, so that a part of the second dictionary is used for the voice recognition, the part used corresponding to the selected window. That is, when the window is selected by means of the corresponding voice-input, the voice-input is compared with the registered words for specifying a relationship between windows, the words being stored in the first dictionary 26, and the comparison being executed by the recognition unit 23. The voice recognition result is then input to the OS 12 via the voice-keyboard emulator 14. The screen control unit 121 of the OS 12 then accesses the second dictionary 27 (the dictionary used for a particular speaker) via the group specification unit 122. The above accessing of the second dictionary 27 is executed with respect to a portion of the dictionary 27 having been defined for a group corresponding to a window the user intends to select (that is, the window the user intends to select is the window corresponding to the voice-input provided for selecting the window). Thus, the next voice recognition operation is executed so that the recognition unit 23 recognizes the next voice-input by comparing the voice-input with only reference voice patterns corresponding to the control command-words predetermined for the selected window.

The following method may be additionally used. That is, the operation for selecting of the window to be active may be executed using the user-assigned names of the windows. That is, when the user provides a voice-input for selecting the window, the voice-input is compared with the user-assigned names of the windows, which user-assigned window names were previously registered in the second dictionary 27, the comparison being executed by the recognition unit 23. The voice recognition result is then input to the OS 12 via the voice-keyboard emulator 14. The result of the comparison indicates a group among the groups of the voice-patterns or the words in the second dictionary 27, each group having been provided for a respective window. The screen control unit 121 of the OS 12 then accesses the second dictionary 27 (the dictionary used for a particular speaker) via the group specification unit 122. The above accessing of the second dictionary 27 is executed with respect to a portion of the dictionary 27 having been defined for a group of words (with voice patterns) corresponding to a window the user intends to select (that is, the window the user intends to select is the window corresponding to the voice-input provided for selecting the window). Thus, the next voice recognition operation is executed so that the recognition unit 23 recognizes the next voice-input by comparing the voice-input with only reference voice patterns corresponding to the control command-words predetermined for the selected window.

Following will be described the process for determining the dictionary or the dictionary part of a dictionary that will be used for the voice recognition operation, that is, the parts of the dictionaries the voice recognition operation will use to compare against the voice-input. Various methods may be used for determining this. The first described method comprises that the following parts in the dictionaries be always used for the voice recognition operation: the entire first dictionary, a part of the second dictionary, a part of the second dictionary corresponding to the currently active window. The second method comprises always using the following parts in the dictionaries for the voice recognition operation: the entire first dictionary, two parts of the second dictionary, a first part of the second dictionary corresponding to the currently active window and a second part of the second dictionary corresponding to the user-assigned window names. The third method comprises using the following parts in the dictionaries for the voice recognition operation: the entire first dictionary (when a command is input by the user), the command indicating that the first dictionary is to be used, always using a first part of the second dictionary corresponding to the currently active window, and a second part of the second dictionary corresponding to the user-assigned name of the windows (when a command is input by the user), and command indicating the that the second part of the second dictionary is to be used. The fourth method comprises that, after the window has been selected using the first dictionary or a part (comprising the user-assigned names of the windows) of the second dictionary, only a part (corresponding to the selected window) of the second dictionary is used, and the use of the first dictionary may be effected when a command is input by the user, the command indicating that the first dictionary is to be used.

A number of words registered in the second dictionary 27 is relatively small, the registration being executed by each user (particular speaker). Thus, a number of words may be reduced as compared to conventional technology, the words corresponding to reference voice patterns which are to be used for comparison in the voice recognition process. Thus, it is possible to prevent recognition efficiency from being degraded and to prevent processing time from becoming overly long.

Figure 5B:
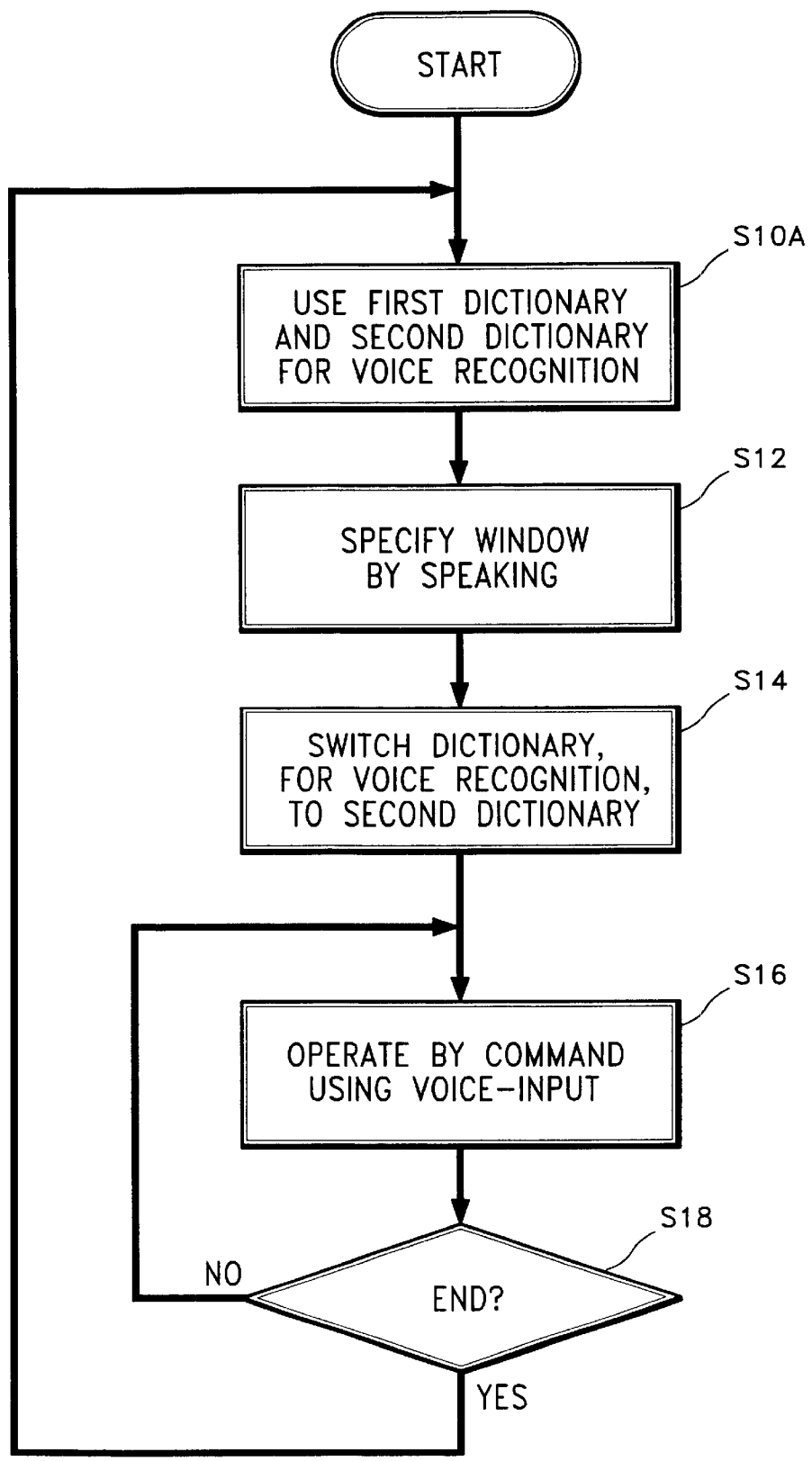

An operation flow of window control operations using the voice recognition according to the embodiment of the present invention will now be described with reference to FIG. 5A and 5B. In a step S10 (hereinafter, the term "step" is omitted so that "S10" is used instead of "step S10") the first dictionary 26 is used for the voice recognition.

Otherwise, as described above, the second dictionary 27 may be used in addition to the method using the first dictionary 26 for the same purpose in S10A.

Then, in S12, voice-input specifying a relationship between the windows is processed and the selected window is displayed in the screen 31, the selection being executed with reference to the specification of relationship. (Switching of the active window may be executed in S12 by providing a voice-input comprising the user-assigned name of the window, which name was previously registered in the second dictionary 27)

Then, in S14, the dictionary to be used for the voice recognition is switched so that the second dictionary 27 is used for the voice recognition, the use of the second dictionary being limited to a part of the second dictionary, the part corresponding to the selected window, the switching being executed via the group specification unit 122. (As mentioned above, it may be that the first dictionary is always used for the voice recognition.)

Then, in S16, a desired operation using the selected window is executed, the operation being executed by specifying a desired command using voice-input.

Then, in S18, it is determined whether or not the command specified in S16 comprises a command that the desired operation using the window has finished (or whether or not a window to be used (window to become active) for a desired operation is to be switched to another window). Unless the determination in S18 indicates the end of the operation or indicates a switching of the window, S16 is then executed and the voice recognition using the second dictionary Z7 continues.

If the determination in S18 indicates the end of the operation or indicates a switching of the window, S10 is then executed and the dictionary to be used for the voice recognition is then switched to the first dictionary 26.

An operation flow of an operation wherein mouse (2) input is replaced with a corresponding voice-input will now be described. The mouse 2 may be used as a pointing device for inputting data concerning coordinates to the OS 12 via the mouse BIOS 17. The cursor 36 is displayed in the screen 31 of the display unit 3 (FIG. 3), a position of the cursor 36 corresponding to the input coordinates. In general, a process for obtaining the coordinates input by means of the mouse 2 is carried out using an interruption process having an interruption process speed that is relatively high with respect to senses of a human being. Thus, an operation using the mouse 2 can be executed in parallel with respect to an operation by means of voice-input. Similarly an operation by means of the keyboard 1 can be executed parallel with an operation by means of voice-input.

In general, the mouse 2 is used for window control. In the embodiment of the present invention, it is possible to switch windows using voice-input, the voice-input concerning a position of the mouse cursor 36 which position may move in a pointing operation thereof (an operation in which coordinate information is input by means of the mouse 2). Thus, if a result of voice recognition comprises control command-words to be used for a pointing operation, the voice recognition being executed for voice-input concerning a position of the cursor 36 displayed on the screen 31, which position may move correspondingly to movement of the mouse 2 to be operated, the control command-words being stored in the first dictionary 26, an operation corresponding to the mouse pointing operation can be replaced by voice-input. That is, the user, concerning a position of the displayed cursor 36, which position may move correspondingly to movement of the mouse 2 which he or she may manipulate, may specify a desired window to be active by speaking, "here" when the user places the cursor 26 at the desired window displayed in the screen 31. The voice recognition process is then executed so that reference voice patterns are recognized to correspond to the word "here" or another word "this window", as control command-words to be used for pointing operations, having been registered in the first dictionary 26. The specified window is then activated after being moved to the frontmost position in the screen 31.

As above, the control command-words such as "here" do not comprise direct names of windows, but rather comprise mutual position relationships between windows, the corresponding control command-words being for use when the personal computer system of FIG. 2 is in the mouse input mode and the control command-words being used for specifying windows.

Then, after the window has been selected to be active, a part of the second dictionary 27 is used for voice recognition in the selected window, the part of the second dictionary 27 corresponding to the selected window.

When the personal computer system of FIG. 2 is in the mouse input mode, voice-input is processed in an operation flow similar to that shown in FIG. 5A. In the case where the personal computer system of FIG. 2 is in the mouse input mode, in a step of the corresponding operation flow, which step corresponds to S12 of FIG. 5A, words are obtained as a result of the voice recognition process, the words being for use in pointing operations, and the recognition being executed for voice-input concerning a position of the cursor 36 controlled by manipulation of the mouse 2.

By the embodiment of the present invention, application of the window control system using voice-input results in an efficient and speedy window control.

Thus, voice recognition efficiency can be improved and a corresponding process can be executed with a high speed.

Further, use of the "non-particular speaker" voice-input recognition system for control of the windows i.e. for selecting of windows in the embodiment of the present invention results in a reduction of the user's troublesome operations for registration of reference voice patterns in the dictionaries.

Further, the present invention is not limited to the above described embodiment, and variations and modifications may be made without departing from the scope of the present invention.

What is claimed is:

1. A window control method comprising:
   storing relationships between first voice patterns and computer commands of a first type in computer memory;
   storing relationships between second voice patterns and computer commands of a second type in computer memory;
   wherein the second voice patterns are specific to a user but the first voice pattern are not specific to said user;
   displaying at least one of a plurality of windows;
   identifying commands of said first type in response to voice input from said user computer-processed through the use of said first voice patterns;
   executing identified commands of said first type to make a selected one of said windows a currently active window;
   identifying commands of said second type in response to voice input from said user computer-processed through the use of said second voice patterns; and
   executing identified commands of the second type to select from among computer operations specific to said currently active window.

2. A window control method as in claim 1 including storing in computer memory relationships between third voice patterns that are specific to said user and commands of the first type, and wherein said step of identifying commands of the first type comprises using said first voice patterns in response to voice input from said user identifying a selected window by a characteristic of a first type but using instead said third voice patterns in response to voice input from the user identifying a window by a characteristic of a second type.

3. A window control method as in claim 2 in which said characteristic of the first type comprises spatial relationships between windows and said characteristic of the second type comprises unique names for windows.

4. A window control method as in claim 2 in which said user determines if the first or the third voice patterns are to be used in said identifying of commands of the first type.

5. A window control method as in claim 4 in which, following a selected input from the user, the first voice patterns are again used in identifying commands of the first type.

6. A window control method as in claim 2 in which, following the selection of a window as a currently active window through use of the first or third voice patterns, only the second and third voice patterns are used in identifying commands in response to voice input from said user.

7. A window control method as in claim 2 in which said first voice patterns are stored in a first dictionary relating commands of the first type to voice patterns that are not specific to said user, and said second and third voice patterns are stored in a second dictionary relating commands of the first type and commands of the second type to voice patterns specific to said user.

8. A computer system comprising:
   a memory storing relationships between first voice patterns and computer commands of a first type in computer memory, and between second voice patterns and computer commands of a second type in computer memory;
   wherein the second voice patterns are specific to a user but the first voice pattern are not specific to said user;
   a display displaying at least one of a plurality of windows
   a processor identifying a commands of said first type in response to voice input from said user through the use of said first voice patterns and executing identified commands of said first type to make a selected one of said windows a currently active window;
   said processor further identifying commands of said second type in response to voice input from said user computer-processed through the use of said second voice patterns and executing identified commands of the second type to select from among computer operations specific to said currently active window.

9. A computer system as in claim 8 wherein said memory further stores relationships between third voice patterns that are specific to said user and commands of the first type, and wherein said processor identifies commands of the first type using said first voice patterns in response to voice input from the user identifying a selected window by a characteristic of a first type but using instead said third voice patterns in response to voice input from the user identifying a window by a characteristic of a second type.

10. A computer system as in claim 9 in which said processor identifies said commands in response to voice input from the user identifying a characteristic of the first type that comprises spatial relationships between windows and a characteristic of the second type comprises unique names for windows.

11. A computer system as in claim 9 in which said processor is responsive to user input determining if the first or the third voice patterns are to be used in said identifying of commands of the first type.

12. A computer system as in claim 9 in which, following the selection of a window as a currently active window through use of the first or third voice patterns, said processor uses only the second and third voice patterns in identifying commands in response to voice input from said user until said user provides said processor with a specific command to again start using the first voice patterns in identifying commands of the first type.

13. A computer system as in claim 9 in which said memory stores said first voice patterns in a first dictionary relating commands of the first type to voice patterns that are not specific to said user, and stores said second and third voice patterns in a second dictionary relating commands of the first type and commands of the second type to voice patterns specific to said user.

14. A window control method comprising:
storing relationships between voice patterns and computer commands in a computer memory;
providing a display showing a number of windows, and providing a pointing device for pointing to a selected window shown on the display;
responding to the pointing device pointing to a selected window shown on the display and responding in parallel to a voice command by computer-processing said voice command through use of said relationships between voice patterns and computer commands stored in computer memory, to make the selected window a currently active window.

15. A window control method as in claim 14, in which the responding step comprises responding to a voice command indicative of a relative position of the selected window with respect to a position of at least one other window shown on the display to make the selected window a currently active window.

16. A window control method as in claim 14, in which the responding step comprises responding to a voice command that is not specific to the selected window.

17. A window control method as in claim 14, further comprising:
storing relationships between specific user voice patterns and computer commands in another computer memory; and
responding to a voice command by computer-processing said voice command through use of said relationships between specific user voice patterns and computer commands stored in computer memory once the selected window is made the currently active window.

18. A window control method as in claim 14, further comprising:
moving the selected window to the front of the display showing a number of windows when the selected window is made the currently active window.

19. A window control system comprising:
a computer having a memory storing relationships between voice patterns and computer commands;
a display coupled with said computer and providing a display showing a number of windows;
a pointing device coupled with said computer and operative under user control to point to a selected window shown on the display;
said computer comprising hardware and software components interacting to respond to the pointing device pointing to a selected window shown on the display and to respond in parallel to a voice command by computer-processing said voice command through use of said relationships between voice patterns and computer commands stored in computer memory, to make the selected window a currently active window.

20. A window control system as in claim 19, in which the computer comprises components interacting to respond to a voice command indicative of a relative position of the selected window with respect to a position of at least one other window shown on the display to make the selected window a currently active window.

21. A window control system as in claim 19, in which the computer comprises components interacting to respond to a voice command that is not specific to the selected window.

22. A window control system as in claim 19, in which the computer comprises another memory storing relationships between specific user voice patterns and computer commands, and components interacting to respond to a voice command by computer processing said voice command through use of said relationships between specific user voice patterns and computer commands stored in computer memory once the selected window is made the currently active window.

23. A window control system as in claim 19, in which the display shows the selected window in the front of the number of windows when the selected window is made the currently active window.

* * * * *